(12) United States Patent
Nakano et al.

(10) Patent No.: US 7,402,940 B2
(45) Date of Patent: Jul. 22, 2008

(54) SURFACE LIGHT EMITTING APPARATUS

(75) Inventors: Koji Nakano, Anan (JP); Tomoaki Inuzuka, Anan (JP)

(73) Assignee: Nichia Corporation, Anan (JP)

( * ) Notice: Subject to any disclaimer, the term of this patent is extended or adjusted under 35 U.S.C. 154(b) by 247 days.

(21) Appl. No.: 11/333,249

(22) Filed: Jan. 18, 2006

(65) Prior Publication Data
US 2006/0158080 A1 Jul. 20, 2006

(30) Foreign Application Priority Data
Jan. 19, 2005 (JP) ............ P 2005-011480

(51) Int. Cl.
*H01J 5/16* (2006.01)
(52) U.S. Cl. ............... 313/113; 313/114
(58) Field of Classification Search ......... 313/498, 313/512
See application file for complete search history.

(56) References Cited

U.S. PATENT DOCUMENTS 6,165,631 A * 12/2000 Boerner et al. .............. 428/690

2003/0189832 A1 10/2003 Rizkin et al.
2004/0080938 A1 4/2004 Holman et al.

FOREIGN PATENT DOCUMENTS

DE 102 11 123 A1 10/2003
JP 2003-057622 2/2003

* cited by examiner

*Primary Examiner*—Vip Patel
(74) *Attorney, Agent, or Firm*—Birch, Stewart, Kolasch & Birch, LLP

(57) ABSTRACT

A surface light emitting apparatus that can be made smaller in depth and lighter in weight and has high uniformity in luminance over the light emitting surface is disclosed. The surface light emitting apparatus of the present invention comprising a substrate, a plurality of light sources on the substrate, and a plurality of reflectors on the substrate, each of the reflectors having a first surface that covers the light sources and a second surface that reflects or scatters the irradiated light, wherein the reflectors are disposed so that the second surface is irradiated with a light emitted by the light source by the first surface of the adjacent reflector, and the light reflected or scattered by the second surface is emitted to outside.

16 Claims, 4 Drawing Sheets

SURFACE LIGHT EMITTING APPARATUS

BACKGROUND OF THE INVENTION

1. Field of the Invention

The present invention relates to a surface light emitting apparatus that uses a plurality of light sources, and, more particularly, to a surface light emitting apparatus having a relatively large area of light emitting surface.

2. Description of the Related Art

Liquid crystal display apparatuses are commonly used in portable electronic devices and various image display apparatuses today. The liquid crystal display apparatus is constituted from liquid crystal cell, prism sheet, a diffusion sheet, a backlight and other major components. For the backlight source, LED, cold cathode tube or the like is used. Different types of backlight source have their own features and are selected according to the application. For example, a backlight source employing the cold cathode tube is used in a relatively large liquid crystal display apparatus, and a backlight source employing the LED is used in a small liquid crystal display apparatus of cellular phones.

All of these backlight sources employ an optical guide plate, whereby light emitted by a cold cathode type fluorescent lamp used as a linear light source or a light emitting diode used as a point light source is diffused over the entire light emitting surface, thereby to effect surface light emission. Various techniques have been developed in order to achieve uniform luminance over the entire light emitting surface.

However, the optical guide plate that is an inevitable component of the backlight source has been hindering the efforts to reduce the weight and/or depth of the backlight source for relatively large liquid crystal display apparatuses.

Against this background, a backlight source that has a hollow space through which light is guided, without employing any optical guide plate has been developed (refer to FIG. 13 and FIG. 14 of Japanese Unexamined Patent Publication No. 2003-57622).

However, in case surface light emission is attempted with light emitted by a point light source or a linear light source without using an optical guide plate, such a problem arises as luminance distribution over the light emitting surface has unevenness, thus resulting in poor uniformity of light emission.

This problem becomes conspicuous particularly when a point light source consisting of light emitting diode is used as the light source.

SUMMARY OF THE INVENTION

In view of the problem described above, an object of the present invention is to provide a surface light emitting apparatus that can be made smaller in depth and lighter in weight and has high uniformity in luminance over the light emitting surface.

In order to achieve the object described above, the surface light emitting apparatus of the present invention comprises a substrate, a plurality of light sources on the substrate, and a plurality of reflectors on the substrate, each of the reflectors having a first surface that covers the light sources and a second surface that reflects or scatters the irradiated light. The reflectors are disposed so that the second surface is irradiated with a light emitted by the light source by the first surface of the adjacent reflector. The light reflected or scattered by the second surface is emitted to outside.

In the surface light emitting apparatus of the present invention having the constitution described above, the first surface of each of the reflectors covers the light source, so that light emitted by the light source is reflected on the first surface and is scattered by the second surface of the adjacent reflector, so as to be emitted to the outside while being diffused.

Thus surface light emission is made possible without using the optical guide plate.

In the surface light emitting apparatus of the present invention, the light source is covered by the first surface of the reflectors, so that light emitted by the light source is not directly emitted to the outside.

Thus the surface light emitting apparatus of the present invention makes it possible to effect surface light emission without using the optical guide plate, and can be reduced in weight and in depth compared to a surface light emitting apparatus that uses an optical guide plate.

Also because light emitted by the light source is not directly emitted to the outside, bright spot caused by direct light from the light source can be prevented from occurring in the surface light emitting apparatus of the present invention.

DESCRIPTION OF THE PREFERRED EMBODIMENTS

The surface light emitting apparatus according to an embodiment of the present invention will now be described below with reference to the accompanying drawings.

Figure 1:
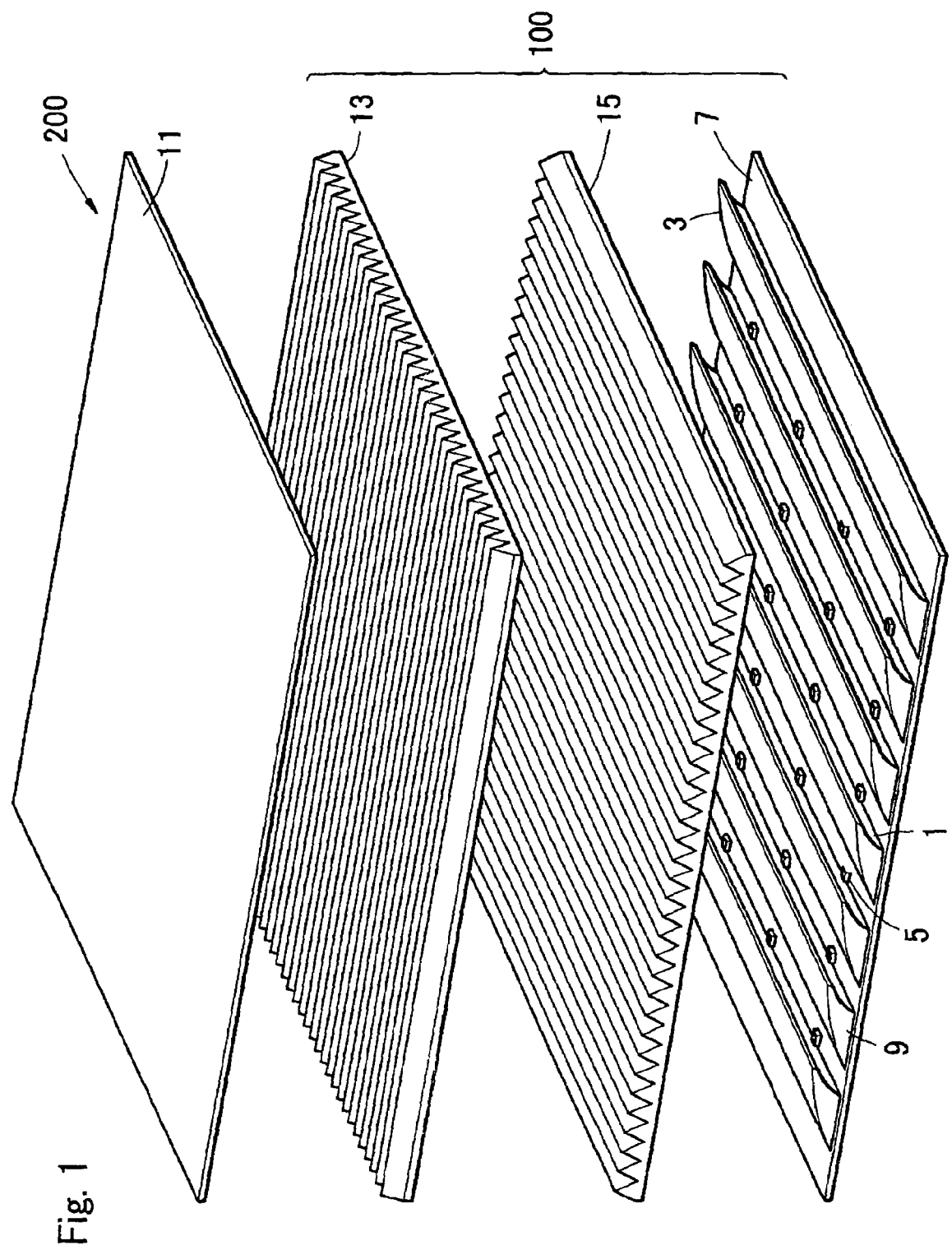
FIG. 1 is an exploded perspective view of the surface light emitting apparatus according to the embodiment of the present invention.

FIG. 1 is an exploded perspective view showing the constitution of a surface light emitting apparatus 100 according to an embodiment of the present invention. The surface light emitting apparatus 100 shown in FIG. 1 is a part of a liquid crystal display apparatus wherein a liquid crystal unit 11 is provided on the surface light emitting apparatus 100.

The surface light emitting apparatus of this embodiment is constituted from a support substrate 7 having light emitting diode 5 and reflector 9 provided thereon and prism sheets 13, 15 without using an optical guide plate as shown in FIG. 1.

Specifically, in the surface light emitting apparatus of this embodiment, as shown in FIG. 2A, the support substrate 7 has a plurality of light emitting diodes 5 disposed in a configuration of a matrix, for example, while each of the reflectors 9 is disposed so as to cover all the light emitting diodes 5 that are disposed in one column. Each of the reflectors 9 has a first surface 1 (first reflecting surface) that opposes the light emitting surface of the light emitting diode 5 and a second surface 3 located at the top, so that light that is emitted by the light emitting diode 5 and is reflected by the first surface 1 of the reflector enters the second surface of the reflector 9 that adjoins thereto. In other words, the second surface of the reflector 9 is irradiated with the light reflected by the first surface. The second surface 3 reflects the light, that has been emitted by the light emitting diode and is incident thereon, toward a prism sheet 15 located above, so that the light is emitted toward the front by the prism sheet 15 and the prism sheet 13.

The components of the surface light emitting apparatus according to this embodiment will now be described in detail below.

<Support Substrate 7>

The support substrate 7 is made of, for example, glass epoxy, and has a power wiring that applies voltage to the light emitting diode 5. Mounted on the mounting surface of the support substrate 7 are light emitting diodes 5 disposed in a predetermined arrangement, and the reflectors 9 mounted at predetermined positions.

The support substrate may also be an aluminum-based substrate or a copper-based substrate. The aluminum-based substrate comprises an aluminum plate laminated with an insulating film on the mounting surface, and has wiring for the light emitting diode 5 provided on the insulation film. The copper-based substrate is similar to the aluminum-based substrate wherein copper is used instead of aluminum.

<Light Emitting Diode>

While the light emitting diode 5 may be either of pin connection type or of surface-mounted type, light emitting diode of surface-mounted type is preferably used in order to achieve smaller thickness. With regards to the color of light emitted by the light emitting diode, light emitting diodes of various light colors may be used depending on the application of the liquid crystal display apparatus and characteristic of the liquid crystal unit that is used therewith. A surface light emitting apparatus that emits white light is typically used as the backlight source. While the light emitting diodes can be roughly classified into a type that combines a light emitting diode chip that emits at a particular wavelength and a fluorescent material and a type that comprises three light emitting diode chips of RGB provided in one package, either type may be used in this embodiment.

According to the present invention, it is possible to obtain a surface light emitting apparatus that emits white light by using three kinds of light emitting diode 5 of three light colors, red (R), green (G) and blue (B), and causing the light rays of three colors to be reflected on the first surface and the second surface of the reflectors 9 so that light of mixed color emerges to the outside.

Figure 2:
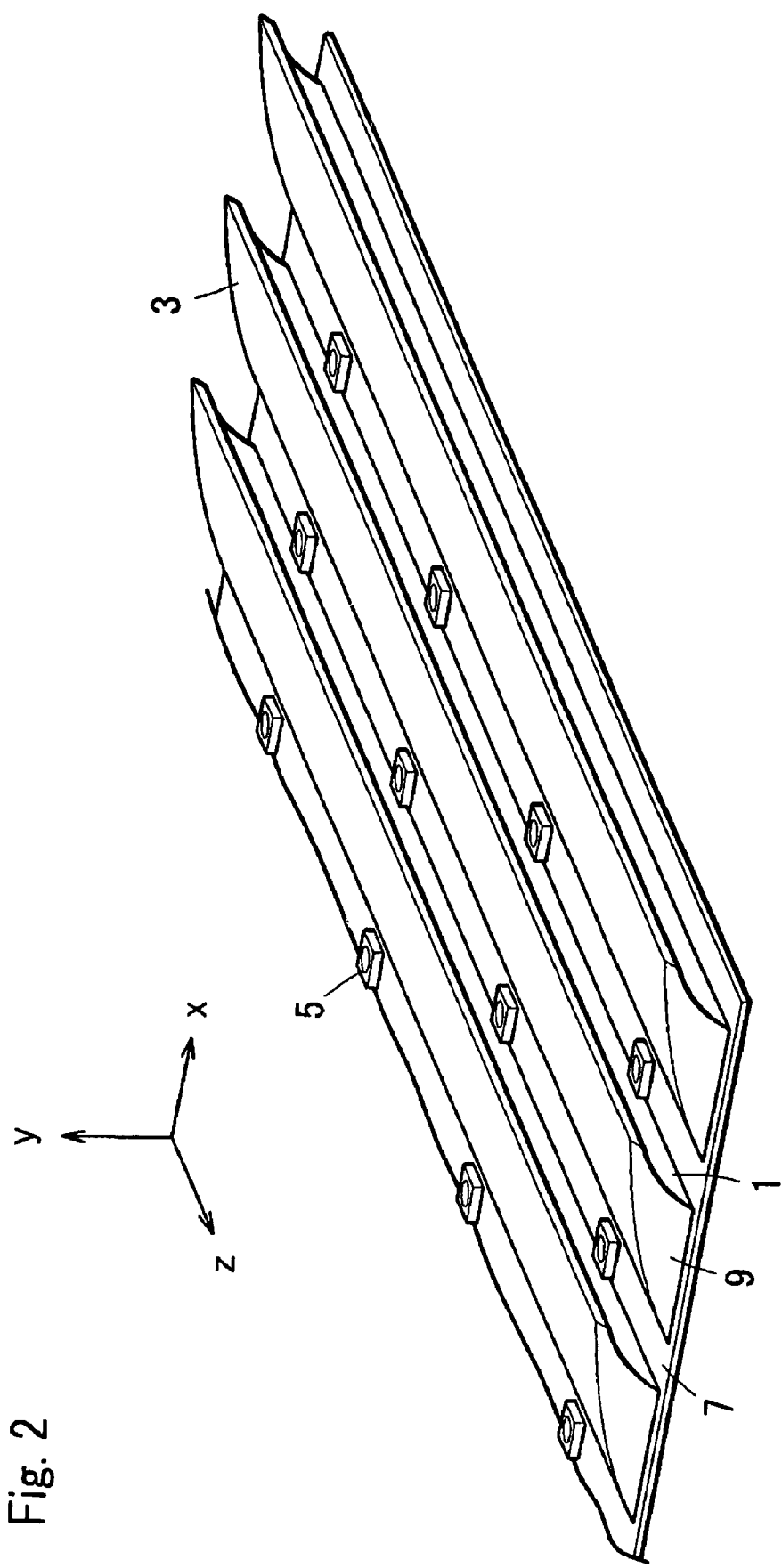
FIG. 2 is a perspective view showing the constitution of the support substrate whereon the light emitting diode and the reflectors are mounted in the surface light emitting apparatus of the embodiment.

The light emitting diodes 5 are mounted on the support substrate 7, for example, at predetermined intervals in Z direction and X direction (referred to as a matrix arrangement in this specification) as shown in FIG. 2. According to the present invention, arrangement of the light emitting diodes 5 is not limited to a matrix but may be such that the light emitting diodes are disposed in a straight line along Z direction but are disposed, for example, in zigzag manner along X direction by changing the Z coordinates of adjoining light emitting diodes.

<Reflector 9>

The reflector 9 covers all the light emitting diodes 5 disposed in Z direction on the first surface 1, while reflecting the light, that comes from the first surface 1 of the adjacent reflector, on the second surface upward (toward the prism sheet 15). Description of this embodiment deals with an example where the second surface is a mirror class reflecting surface, although the second surface may also be such that causes random reflection according to the present invention.

The first surface 1 of the reflector 9 reflects light emitted by the light emitting diode 5, that is covered by the surface, toward the second surface 3 of the adjacent reflector 9.

Since the reflector 9 covers all the light emitting diodes 5 disposed in Z direction, they are mounted on the mounting surface of the support substrate 7 so that the longitudinal direction of the reflector agrees with Z direction.

Specific surface configurations, forms of surface and variations of the first surface 1 and the second surface 3 of the reflector 9 will be described in detail later.

The reflector is preferably made of a light weight material in consideration of the application thereof to large display screens. The first surface and the second surface are preferably made of a material having high reflectivity or are coated with a metallic material on the surface for efficient reflection of light. Specifically, acrylic resin, polycarbonate resin, amorphous polyolefin resin, polystyrene resin, norbornene-based resin, cycloolefin polymer (COP), acrylonytrile-butadiene-styrene resin (ABS) or the like may be used. Al or other metal may be used as the reflecting material. When Al is used, it may be accompanied by either surface treatment or mirror surface finishing.

<Prism Sheets 13, 15>

The prism sheets 13, 15 are made by laminating a film having a pattern of prisms on a sheet made of polycarbonate, or laminating a film made of an acrylic resin having a pattern of prisms on a sheet made of a polyester. The prism sheet directs the light reflected by the second surface of the reflector 9 to the direction normal to the liquid crystal unit 11. The prism sheets 13, 15 are disposed so that the directions of the prisms formed thereon cross at right angles with each other. The prism sheet 15 has a plurality of prisms of triangular cross section formed along Z direction on the top surface thereof, and directs a component of the light reflected by the second surface 3 that lies in the X-Y plane to the direction normal to the liquid crystal unit 11.

The prism sheet 15 has a plurality of prisms of triangular cross section formed along X direction on the top surface thereof, and directs a component of the light reflected by the second surface 3 that lies in the Y-Z plane to the direction normal to the liquid crystal unit 11. Thus the light reflected by the second surface 3 is directed to the direction normal to the liquid crystal unit 11 as it passes the prism sheets 13, 15.

The surface light emitting apparatus according to this embodiment of the present invention, with the constitution described above, achieves surface light emission by diffusing the light that is emitted by the light emitting diode which is regarded as a point source, without using the optical guide plate. In the surface light emitting apparatus of this embodiment, surface light emission is effectively achieved from the light emitted by the light emitting diode with uniform distribution of light intensity, through the surface configuration and size of the first surface 1 and the second surface 3, and intervals, configuration and arrangement of the reflectors 9 that are properly selected.

<Shape, Number and Spatial Relationship of Elements>

According to this embodiment, the number of the light emitting diodes to be used is determined depending on the size of the light emitting surface of the backlight source, required level of luminance and other factors.

When the number of light emitting diodes is determined, positions of the light emitting diodes on the mounting surface of the support substrate 7 are determined. The light emitting diodes are preferably disposed at equal spaces.

The first surface 1 of the reflector 9 is provided for the purpose of reflecting light so that substantially all of the light is incident on the second surface of the adjacent reflector 9. Therefore, surface configuration of the first surface 1 and the relative position thereof with the light emitting surface of the light emitting diode are determined by taking into consideration the position, size and shape of the second surface of the adjacent reflector 9.

The second surface 3 of the adjacent reflector 9 reflects the light coming from the first surface 1 and directs it to the prism sheets 15, 13. It goes without saying that the position, size and shape of the second surface 3 are determined in consideration of the shape and position of the first surface 1, but the position, size and shape of the second surface 3 are determined also by giving consideration to the relationship thereof with the second surface of the other reflector 9. That is, when the shape and relative position of the second surface 3 are determined so that light rays reflected on the second surfaces 3 of the plurality of reflectors enter the prism sheets 15, 13 with uniform distribution of light intensity over the X-Z plane, the surface light emitting apparatus capable of surface light emission with uniform luminous intensity can be obtained. Edge of the second surface 3 may reach the edge of the light emitting diode 5.

In case light emitting diode having such a directivity characteristic is used as the light intensity is highest in the vicinity of central axis of light emission and decreases with the distance from the central axis of light emission (as the angle from the central axis of light emission increases), surface light emission with uniform luminous intensity can be achieved as follows.

First Method

As already described, the light emitted by the light emitting diode is reflected twice on the first surface 1 and on the second surface 3 before reaching the prism sheet 15. Therefore, the surface shapes and relative positions of the first surface 1 and the second surface 3 are determined so that the extent of the region of high intensity of light emitted by the light emitting diode in the vicinity of the central axis of light emission is larger than that of light having lower intensity located away from the central axis of light emission. That is, when the shape and relative position of the second surface 3 are determined so that light rays reflected on the second surfaces 3 of the plurality of reflectors enter the prism sheets 15, 13 with uniform distribution of light intensity over the X-Z plane, the surface light emitting apparatus capable of surface light emission with uniform luminous intensity can be obtained.

Second Method

Surface light emission with uniform luminous intensity may be achieved also by making such an arrangement as light rays reflected on adjacent second surfaces overlap with each other upon reaching the prism sheet 15.

For example, the surface shapes and relative positions of the first surface 1 and the second surface 3 are determined so that light of low intensity located away from the central axis of light emission of the light reflected by one of the adjacent second surfaces and light of low intensity located away from the central axis of light emission of the light reflected by the other one of the adjacent second surfaces are superposed so as to add up the light intensity. In this way, too, surface light emission with uniform luminous intensity can be achieved.

According to the present invention, surface light emission with uniform luminous intensity may be achieved also by combining the first method and the second method.

Now the shapes of the first surface 1 and the second surface 3 will be described below.

In the surface light emitting apparatus of this embodiment, surfaces of the first surface 1 and the second surface 3 may be flat or curved surfaces as long as the functions described above can be achieved. However, in order to achieve surface light emission with uniform luminous intensity, they are preferably curved surfaces that allow it to adjust the extent of diffusion of light in accordance to the direction of light emerging from the light emitting diode. In case curved surfaces are selected in this embodiment, it may be a part of parabolic cylinder surface, a part of hyperbolic cylinder surface or a part of elliptic cylinder surface, or alternatively a spherical surface. Use of such a curved surface makes it easier to design the optical system.

The parabolic cylinder surface refers to a curved surface defined as a collection of points of which distance from a datum plane is equal to its distance from the directrix that is parallel to the datum plane (distance in a plane perpendicular to the directrix). The hyperbolic cylinder surface refers to a curved surface defined as a collection of such points that the difference between the distances from two parallel directrices (distance in a plane perpendicular to the directrix) is constant. The elliptic cylinder surface refers to a curved surface defined as a collection of such points that the sum of the distances from two parallel directrices (distance in a plane perpendicular to the directrix) is constant.

In other words, the parabolic cylinder surface shows a parabolic curve in a section thereof that is parallel to the x-y plane, the hyperbolic cylinder surface shows a hyperbolic curve in a section thereof that is parallel to the x-y plane, and the elliptic cylinder surface shows an elliptic curve in a section thereof that is parallel to the x-y plane.

Figure 3:
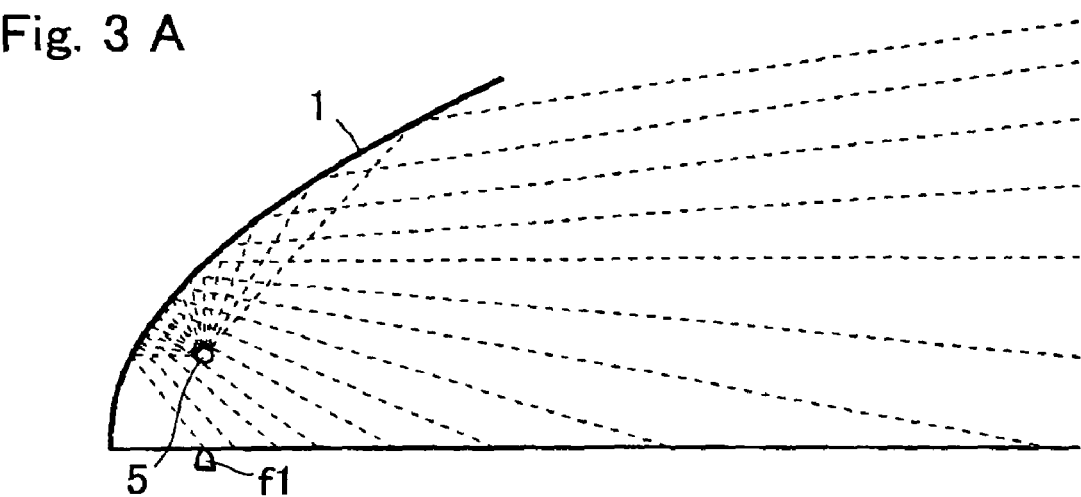
FIG. 3A shows light being reflected on the first surface formed as a part of parabolic cylinder surface in the surface light emitting apparatus of the embodiment (part 1).
FIG. 3B shows light being reflected on the first surface formed as a part of parabolic cylinder surface in the surface light emitting apparatus of the embodiment (part 2).
FIG. 3C shows light being reflected on the first surface formed as a part of parabolic cylinder surface in the surface light emitting apparatus of the embodiment (part 3).
Figure 3:
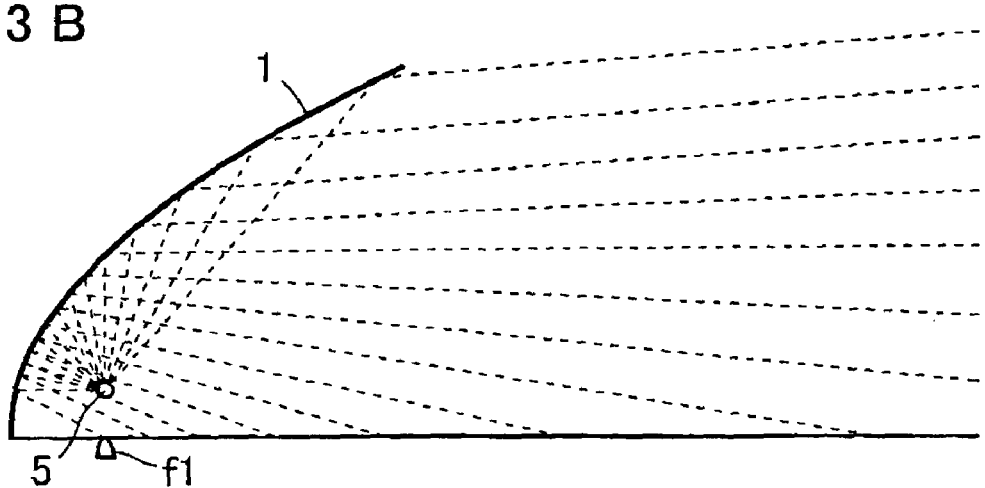
Figure 3:
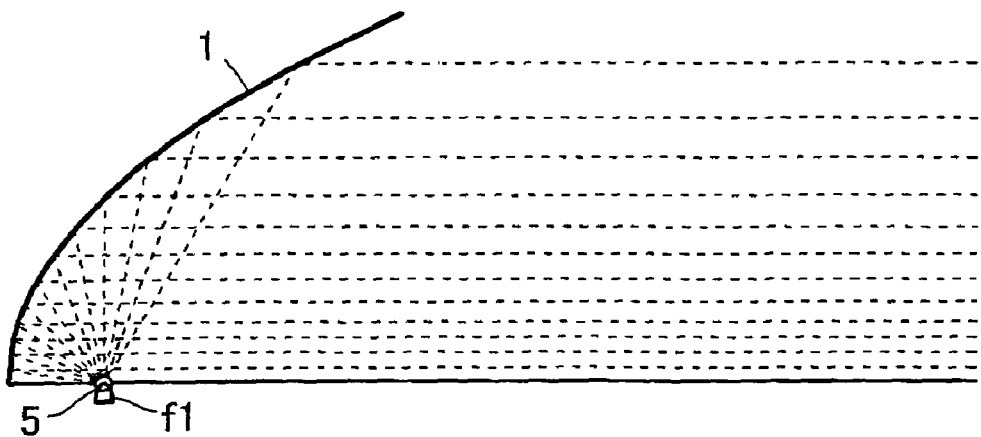

FIG. 3A through FIG. 3C show the cases where the first surface 1 is formed as a parabolic cylinder surface. FIG. 3C shows a case where the light emitting diode is located on directrix f1, FIG. 3A shows a case where the light emitting diode is located nearer to the first surface than the directrix, and FIG. 3B shows a case where the light emitting diode is located at an intermediate position between the above two cases. As will be clear from FIG. 3A through FIG. 3C, spread of light that has been reflected on the first surface 1 can be controlled by changing the position of the light emitting diode 5 relative to the first surface 1, even when the shape of the first surface 1 remains the same.

In the case shown in FIG. 3C where the light emitting diode 5 is disposed on the directrix, light rays emitted by the light emitting diodes are directed in parallel directions after being reflected. This constitution makes it easier to design the shape of the second surface, and also enables it to reduce the influence of errors in the relative position of adjacent reflectors.

When the light emitting diode 5 is located nearer to the first surface, light from the light emitting diode can be diffused over a wider region after reflection.

Figure 4:
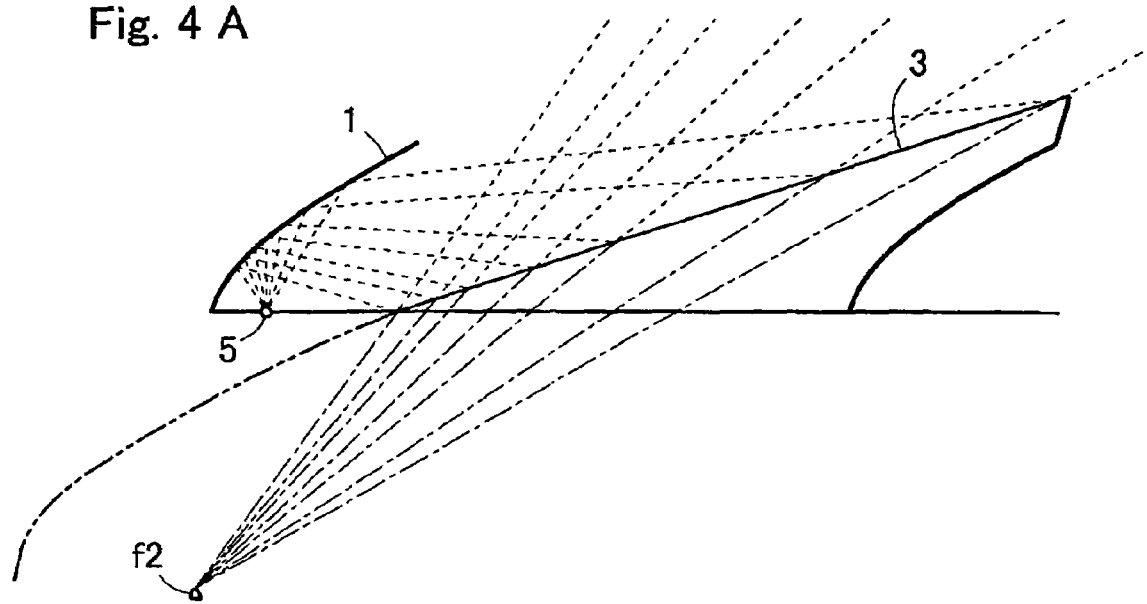
FIG. 4A shows light being reflected on the first surface formed as a part of hyperbolic cylinder surface and on the first surface formed as a part of hyperbolic cylinder surface in the surface light emitting apparatus of the embodiment (part 1).
FIG. 4B shows light being reflected on the first surface formed as a part of hyperbolic cylinder surface and on the first surface formed as a part of hyperbolic cylinder surface in the surface light emitting apparatus of the embodiment (part 2).
Figure 4:
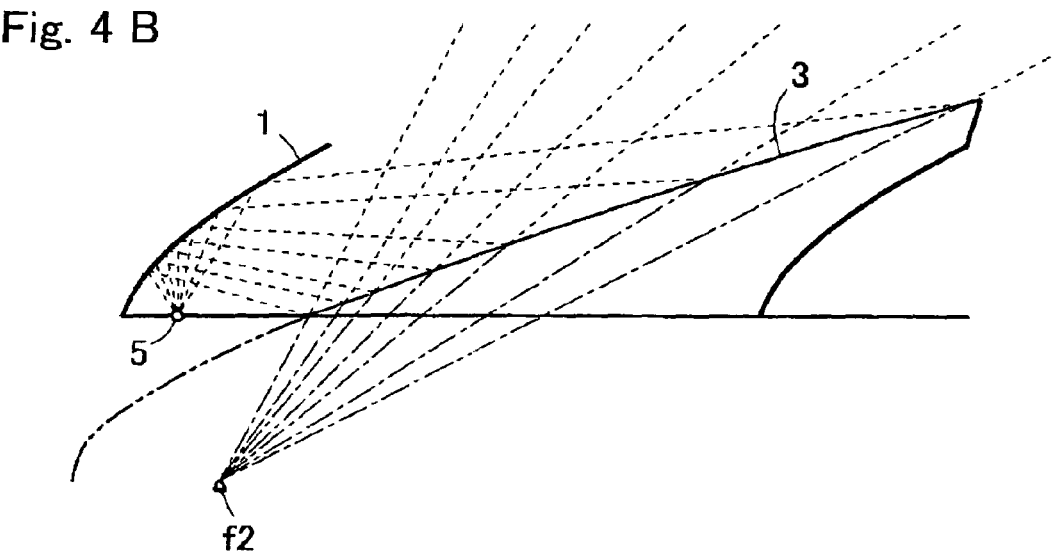

FIG. 4A and FIG. 4B show the cases where both the first surface 1 and the second surface 3 are formed as hyperbolic cylinder surface. In FIG. 4A and FIG. 4B, the light emitting diode 5 is located on the directrix of the first surface. Even when the first surface is formed in hyperbolic cylinder surface, spread of light that has been reflected on the first surface 1 can be controlled by changing the position of the light emitting diode 5 relative to the first surface 1, similar to the case of the first surface 1 formed in parabolic cylinder surface.

The cases shown in FIG. 4A and FIG. 4B have a difference in the position of the directrix f2 in the second surface. In FIG. 4A, the second surface is constituted by using a part of the hyperbolic cylinder surface located at a position more distance from the directrix than in the case of the second surface shown in FIG. 4B. The second surface shown in FIG. 4B has a radius of curvature larger than that of the second surface shown in FIG. 4A, in indicating that the second surface shown in FIG. 4A is nearer to a flat surface. Consequently, spread of light after being reflected by the second surface is larger in the case shown in FIG. 4B.

Thus direction of reflection and diffusion of light can be controlled by means of the positions of the focal axis and the light emitting diode using hyperbolic cylinder surface or parabolic cylinder surface. Therefore, surface light emission with uniform luminous intensity can be achieved by optimizing the parameters through iteration.

In case the elliptic cylinder surface is used, too, surface light emission with uniform luminous intensity can be achieved by means of the positions of the focal axis and the light emitting diode.

According to the present invention, the first surface and the second surface may also be a pseudo curved surface consisting of a plurality of flat surfaces such as a mirror ball.

The surface light emitting apparatus according to the embodiment of the present invention has characteristic effects as described below.

First, since a plurality of reflectors 9 are used to diffuse the light emitted by the point light source of light emitting diode in the surface light emitting apparatus according to the embodiment of the present invention, surface light emission can be achieved without using an optical guide plate and the surface light emitting apparatus can be made with larger area of light emitting surface, smaller depth and lighter weight.

In the surface light emitting apparatus according to the embodiment of the present invention, since the light emitting diodes can be disposed in 2-dimensional arrangement (for example, matrix), the number of light emitting diodes can be set in accordance to the required level of luminance, and surface light emission with high level of luminance can be easily achieved without being restricted by structural factors.

In the conventional type that uses an optical guide plate, the light emitting diodes are disposed on the side face of the optical guide plate, thus resulting in a limitation on the number of light emitting diodes that can be used.

Thus the present invention makes it easy to constitute a large backlight source of high luminance from the light emitting diodes, and makes it possible to provide the surface light emitting apparatus that can be used in a large liquid crystal display apparatus.

Moreover, the surface light emitting apparatus according to the embodiment of the present invention is capable of achieving surface light emission with uniform luminous intensity by means of the shape and relative position of the first surface 1 and the second surface 3.

Particularly in the structure of this embodiment, since light emitted by the light emitting diode is diffused through two stages of reflection on the first surface 1 and on the second surface 3, light can be easily spread 2-dimensionally even when a point light source of light emitting diode is used.

Also because the light emitting diode consumes less electric power and has longer service life, the surface light emitting apparatus of lower power consumption and longer service life can be made by using the light emitting diodes.

The present invention has been described in the case of the surface light emitting apparatus of the embodiment. However, the present invention is not limited to the embodiment, and various modifications may be made within the scope of the present invention.

Typical variations will be described below.

Variation 1

In the surface light emitting apparatus according to the embodiment of the present invention, the second surface 3 is a smooth reflecting surface (mirror surface). However, according to the present invention, the second surface may be a rough surface that scatters the incident light thereupon.

When the surface light emitting apparatus of Variation 1 having such a constitution is used in an application other than the surface light emitting apparatus (an application where it is not necessary for light to emerge in a direction normal to the light emitting surface), a simple constitution is made possible without using any prism sheet.

Variation 2

While the surface light emitting apparatus of the embodiment uses the light emitting diodes disposed in the matrix configuration, the present invention is not limited to this constitution, and halogen lamp or HID lamp, that is also point light source, may be used instead of the light emitting diode.

The present invention may be implemented by using, instead of the light emitting diode, cold cathode tube fluorescent lamp (CCFL), hot cathode tube fluorescent lamp (HCFL), externally powered fluorescent lamp, organic EL, inorganic EL or the like that are linear light sources.

According to the present invention, combination of point light source and linear light source may be used as the light source.

Variation 3

While the surface light emitting apparatus according to the embodiment described above comprises the reflector having the first surface 1 and the second surface 3, the structure comprising the first surface 1 and the structure comprising the second surface 3 may be formed separately. Similar effects to those of the embodiment can be achieved also with this constitution.

Variation 4

In this embodiment, the reflector that covers all the light emitting diodes disposed in one column is provided. However, the present invention is not limited to this configuration and one reflector may be provided for every one of the light emitting diodes.

While typical variations have been described, the present invention is not limited to the embodiment and the variations described above, and further modifications can be made within the scope of the present invention.

EXAMPLE 1

Components of Example 1 of the present invention will be described below.

An aluminum-based substrate is used as the support substrate 7.

The reflector 9 is made of a white polycarbonate resin. The first surface 1 is processed for mirror finish, while the second surface 3 is processed with sand blast. The reflector is formed in hyperbolic cylinder surface in both the first surface 1 and the second surface 3 as shown in FIG. 4A. The light emitting diode used as the light source is located at the focal point of the first surface 1. The reflector measures 32 mm along the shorter side (x axis direction in FIG. 2) and 200 mm along the longer side (z axis direction in FIG. 2). Each of the reflectors is disposed to cover four light emitting diodes 5. 15 reflectors 9 are disposed in the direction of the shorter side, and 4 reflectors 9 are disposed in the direction of the longer side, in an array of 15 rows by 4 columns. Two prism sheets are disposed right above the reflector with the prism surface facing up. Thus the surface light emitting apparatus for 40-inch display is made.

Each of the light emitting diodes 5 is driven by applying a voltage Vf of 4.3 V to supply current If of 350 mA. The surface light emitting apparatus constituted as described above emits light with luminous intensity of about 6000 cd/M$^2$ with no abnormality such as localized bright spot of higher intensity.

EXAMPLE 2

Components of Example 2 of the present invention will be described below. Constitution is similar to that of Example 1 unless otherwise specified.

The reflector 9 is made of an acrylic resin. The first surface 1 is formed in parabolic cylinder surface and is coated with Ag by vapor deposition to form a mirror surface as shown in FIG. 3C. The second surface 3 is formed in a flat surface and is covered by a light diffusing sheet made of a white polycarbonate resin.

With this constitution and the rest similar to that of Example 1, the surface light emitting apparatus showed characteristics comparable to those of Example 1.

The surface light emitting apparatus of the present invention can be applied to the backlight source of the liquid crystal display apparatus used to display pictures in channel letter, computer, word processor, television receiver and the like, and also to other wide range of applications.

What is claimed is:

1. A surface light emitting apparatus comprising;
a substrate,
a plurality of light sources on said substrate, and
a plurality of reflectors on said substrate, each of said reflectors having a first surface that covers the light sources and a second surface that reflects or scatters the irradiated light,
wherein said reflectors are disposed so that said first surface of each of said reflectors reflects the light emitted by one or more of said light sources to irradiate the second surface of the adjacent reflector, and the light reflected or scattered by said second surface is emitted outwardly.

2. The surface light emitting apparatus according to claim 1;
wherein said first surface is reflecting surface of a curved surface.

3. The surface light emitting apparatus according to claim 2;
wherein said second surface is a rough surface.

4. The surface light emitting apparatus according to claim 1;
wherein each of said first surface covers said light sources disposed on a straight line and said reflectors are arranged in parallel in a longitudinal direction.

5. The surface light emitting apparatus according to claim 4;
wherein said curved surface comprises a part of a parabolic cylinder surface having a focal axis parallel to said straight line.

6. The surface light emitting apparatus according to claim 5;
wherein said second surface is a rough surface.

7. The surface light emitting apparatus according to claim 4;
wherein said curved surface comprises a part of a hyperbolic cylinder surface having a focal axis parallel to said straight line.

8. The surface light emitting apparatus according to claim 4;
wherein said curved surface comprises a part of an elliptic cylinder surface having a focal axis parallel to said straight line.

9. The surface light emitting apparatus according to claim 4;
wherein said second surface is a rough surface.

10. The surface light emitting apparatus according to claim 1;
wherein said second surface is a rough surface.

11. The surface light emitting apparatus according to claim 10;
wherein said second surface scatters the irradiated light by reflecting.

12. The surface light emitting apparatus according to claim 1;
wherein said light source is a light emitting diode.

13. The surface light emitting apparatus according to claim 12;
wherein a luminescent color of said light emitting diode is white.

14. The surface light emitting apparatus according to claim 13;
wherein said light emitting diode has a light emitting diode chip and a fluorescent material which converts a wavelength of the light from the light emitting diode chip.

15. The surface light emitting apparatus according to claim 13;
wherein said light emitting diode has a plurality of light emitting diode chip of which luminescent colors are different from each other.

16. The surface light emitting apparatus according to claim 1; further comprising, one or more prism sheets above said second surface.

* * * * *